Figure 5:
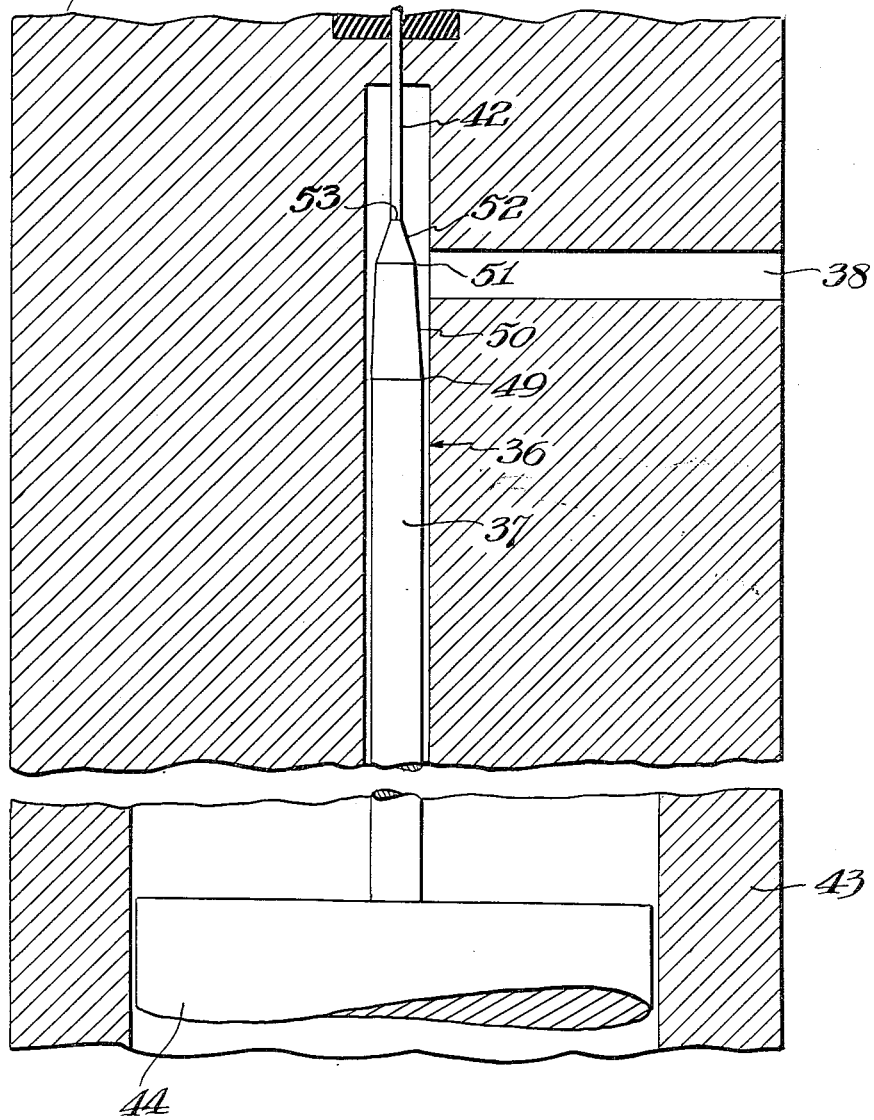

Nov. 27, 1956 — R. A. STRUB — 2,772,103
ROTARY SHAFT SEAL AND PRESSURE REGULATOR
Filed Dec. 2, 1952
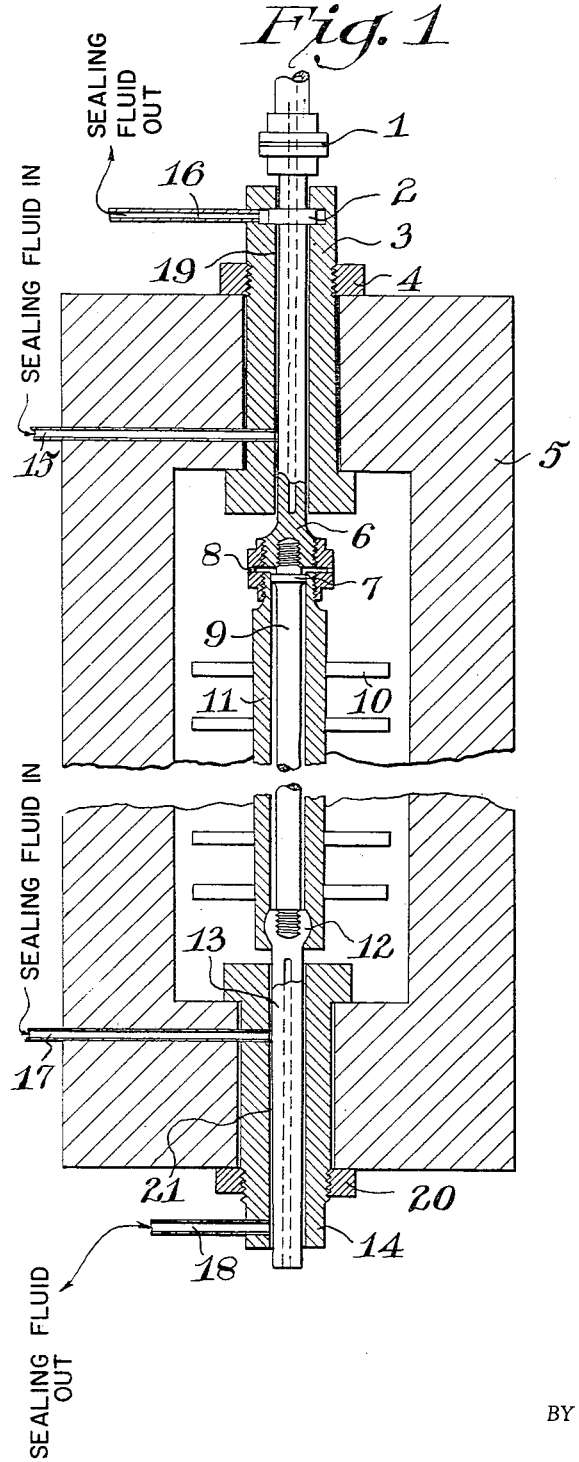
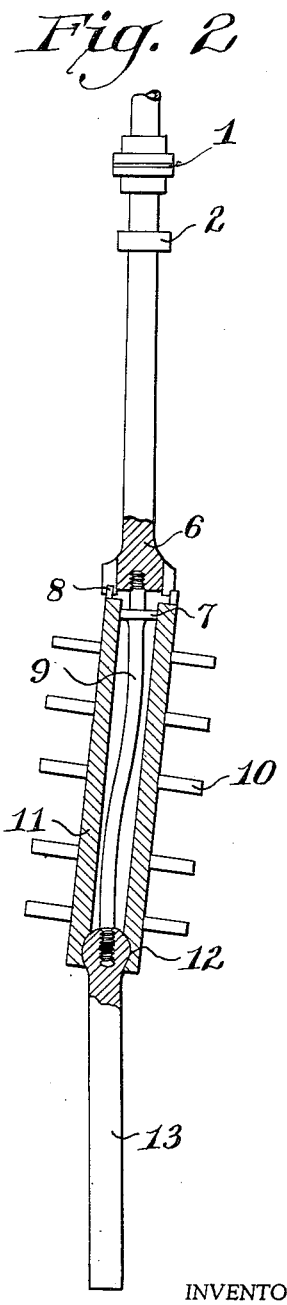
INVENTOR
René A. Strub
BY Earl L. Tyner, Jr.
ATTORNEY

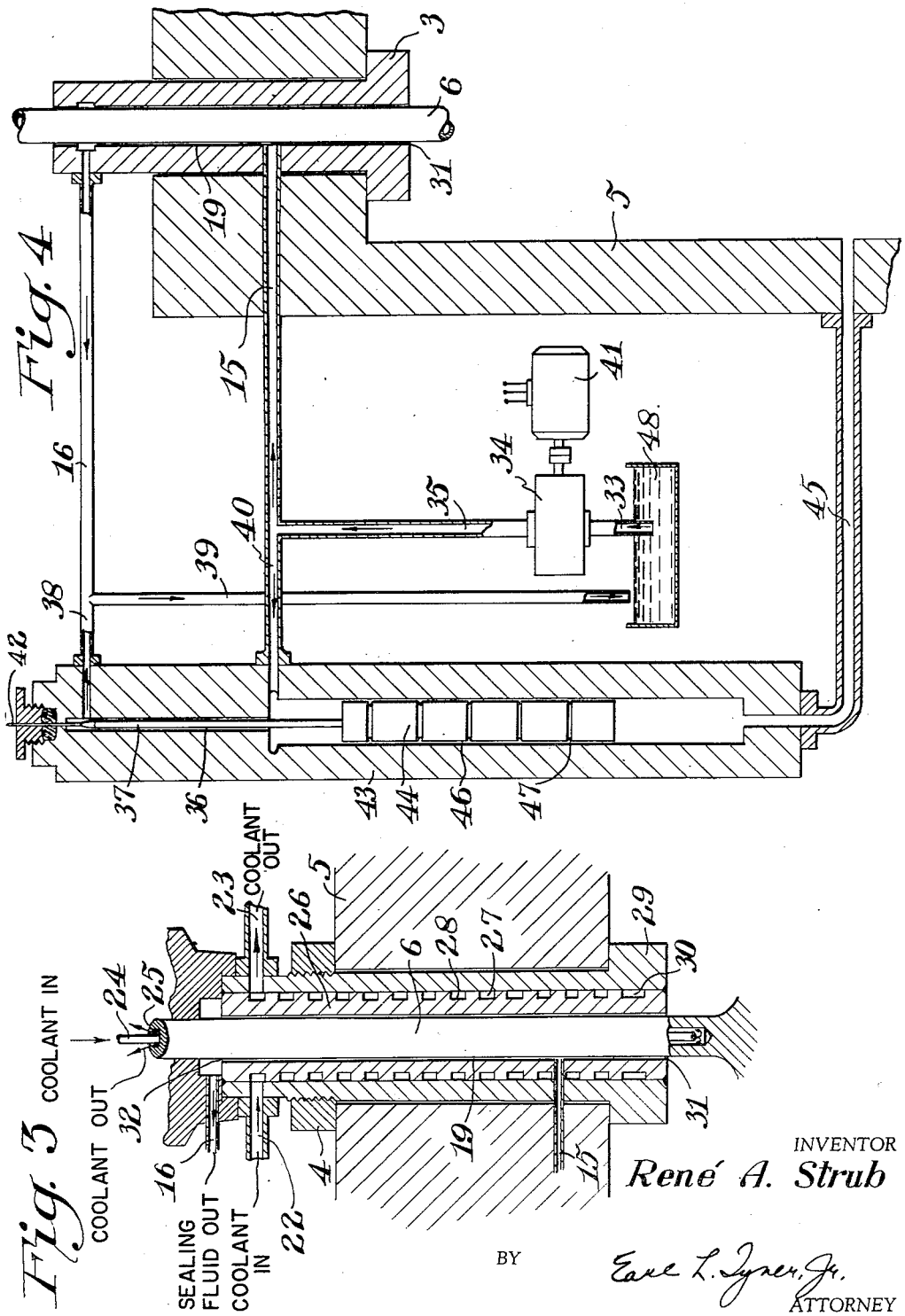

United States Patent Office 2,772,103
Patented Nov. 27, 1956

2,772,103

ROTARY SHAFT SEAL AND PRESSURE REGULATOR

René A. Strub, Charleston, W. Va., assignor to E. I. du Pont de Nemours and Company, Wilmington, Del., a corporation of Delaware Application December 2, 1952, Serial No. 323,632

2 Claims. (Cl. 286—9)

This invention deals with shaft seals, and, more particularly, with seals for rotating shafts wherein the sealing action is accomplished by a fluid under pressure. Still more particularly, this invention includes a rotary shaft seal in which the pressure of the sealing fluid is automatically controlled by a novel regulator.

It is an object of the present invention to provide a suitable arrangement whereby a rotating shaft may extend through the walls of a vessel having an internal process pressure of up to 3000 atmospheres or more, and to provide a combined bearing and fluid-seal for the rotating shaft, through which the sealing fluid flows in negligible quantities into the pressurized vessel.

It is also an object of this invention to provide a means for regulating the sealing fluid pressure to conform closely to the process fluid pressure and to quickly follow its fluctuations. Other objects will appear hereinafter.

A better understanding of the invention can be had by reference to the drawings attached hereto. Figure I shows a reaction vessel fitted with an agitator on a rotating shaft which extends through both ends of the vessel and which is held in place by a fluid seal at each end of the reaction vessel. Figure II shows the action of the shaft and agitator assembly when there is a misalignment between the upper and lower bearing-seals. Figure III shows the cooling system which controls the temperature of the bearing material, the shaft, and the sealing fluid. Figure IV shows the pressure regulator which controls the pressure of the sealing fluid. Figure V shows a detailed view of the tip of the needle of the pressure regulator illustrated in Figure IV.

With specific reference to Figure I, there is shown a general application of the bearing-seals of this invention to a long-shaft assembly supporting an agitator inside a high pressure reactor. The shaft assembly is driven through a standard flexible coupling 1. The upper seal shaft 6 is connected through another flexible coupling 8 to the hollow agitator shaft 11, to which are attached agitator blades 10. Agitator shaft 11 is connected to the lower seal shaft 13 through a spherical joint or universal joint 12. The upper and lower seal shafts 6 and 13 are subjected to axial thrusts from the internal process pressure of the reactor 5 acting upon the cross-sectional area of shafts 6 and 13, these thrusts tending to expel the shafts from the reactor. Thrust neutralizing rod 9 balances against each other the axial thrusts just mentioned. Rod 9 is flexible enough to bend in case of misalignment of the upper and lower seals, as shown in Figure II. The closer the diameter of rod 9 approaches the diameters of the upper and lower seal shafts 6 and 13, the smaller will be the axial stress in rod 9. A flexible cable of the proper diameter may be used for the thrust neutralizing rod 9. Rod 9 is centered inside the hollow agitator shaft 11 by a guide 7, and is attached to each seal shaft by a threaded connection. The weight of the shaft assembly and the hydrodynamic forces such as those arising from the pitch of the agitator blades 10 are carried by an axial thrust bearing 2. Only one thrust bearing is necessary to include another such bearing on the lower seal shaft. Other arrangements can be imagined. The driving shaft with its flexible coupling 8 could be used as the lower seal shaft and the thrust bearing would be placed on shaft 13 which would then be the upper seal shaft. Another possibility would be to place, in Figure I, the thrust bearing on shaft 13. The upper and lower seal bushing assemblies 3 and 14, described in detail hereinafter, are held in place by nuts 4 and 20. Sealing fluid is introduced to the upper seal through line 15, flows through the small clearance 19 between the upper seal shaft 6 and the upper seal bushing assembly 3, and thence out through line 16. Before process pressure is applied, radial clearance 19 is in the order 0.3 to 1.5 thousandths of an inch, depending on the size of the shaft utilized. For example, when using a 0.75 inch diameter shaft, it is preferable that radial clearance 19 be about 0.0005 to 0.0007 inch, and when using a shaft of 1.50 inches diameter, it is preferable that radial clearance 19 be about 0.0008 to 0.0011 inch. The pressure on the sealing fluid entering through line 15 is slightly in excess of the process pressure inside vessel 5. A very small amount of sealing fluid flows from line 15 through clearance 19 to the inside of vessel 5, however all but this very small amount of the sealing fluid flows in the opposite direction and out line 16 to atmospheric pressure. Sealing fluid flows through the lower seal in exactly the same manner as described for the upper seal. Sealing fluid enters the lower seal through line 17 and into the clearance 21, a very small amount of the fluid flowing into the inside of reactor 5, while the remainder of the fluid flows out through line 18 to atmospheric pressure.

Figure II shows how the thrust neutralizing rod 9 will flex when there has been a misalignment of the upper and lower end of the hollow agitator shaft 11 rotating around the spherical or universal joint 12.

Figure III is a schematic drawing of the details of the upper shaft seal indicated generally by 3 in Figure I. The drawing of Figure III does not show the axial thrust bearing 2, but otherwise is a complete drawing of the bearing-seal of this invention. The lower seal is exactly the same as the upper seal except that it faces the opposite direction and that it does not have an axial thrust bearing incorporated into its design. Rotating shaft 6 is encased by the seal which is composed essentially of two parts, namely, the bushing 26 and the bushing jacket 29. The bushing jacket 29 is held in place by shoulders resting on the inside surface of the reaction vessel 5 and a nut 4 which rests against the outside surface of reaction vessel 5 and is joined by a threaded connection to the bushing jacket 29. The outer surface of the bushing 26 is provided with double helical grooves 27 and 28 which are connected only by the groove 30 at the end of the bushing which is inside the reaction vessel 5. One of the double helical grooves 27 and 28 is connected to the coolant inlet 22 while the other groove is connected to the coolant outlet 23. Thus a coolant such as water may be introduced at 22 under pressure causing it to flow in one helical groove 27 or 28 down to groove 30 and thence back up the other helical groove 28 or 27 to the outlet 23. The bushing jacket 29 fits tightly over the outer surface of the bushing 26 thus preventing any short circuiting of the coolant path from one groove to another. The shaft 6 may also be fitted with a cooling system by inserting a tube 24 into a hole drilled down the axis of shaft 6. There is formed thereby concentric compartments such that coolant may be introduced through the inside of tube 24, flowing downwardly and being expelled from tube 24 at the bottom of hole 25, and thence flowing upwardly in the annulus around the outside of the tube 24 to a final discharge at the top of the hole 25.

The space 19 between the rotating shaft 6 and the stationary bushing 26 is fitted with a sealing fluid introduced at 15 and discharged at 16. The magnitude of radial clearance 19 is from about 0.5 to about 1.5 thousandths of an inch. The pressure of the sealing fluid at 15 is maintained at a slightly higher value than the process pressure inside the reaction vessel 5, thus a small amount of sealing fluid may be expelled at 31. The sealing fluid may be at pressures well above 1000 atmospheres at 15, and at the same time, be under pressures of 1 to 2 atmospheres leaving the seal at 32, and yet have a seepage at 32 of no more than about 60 drops per minute. Since the pressure at 31 is only slightly below the pressure at 15, the seepage at 31 will be limited to about one drop per minute.

There is an inherent difficulty with the employment of extremely close clearances between rotating shafts and their bushings. Seizure of the shaft is apt to occur, at the ends since side leakage along the shaft prevents the building up of the hydrodynamic self-centering pressure which is an effective safeguard in the middle portion of the shaft. However, it has been found in the practice of this invention that if either the ends of the bore of the bushing 26, or of the opposite portions of the shaft are tapered near points 31 and 32, the probability of shaft seizure is reduced materially. The recommended taper is a straight line taper, forming a conical surface at each end of the bushing or on the opposite portion of the shaft such that at 31 and 32 the radial clearance is about 1.5 times the radial clearance 19 at the center of the bushing. The length of the taper in an axial direction should be about twice the diameter of the shaft 6. For example, if shaft 6 is 1 inch in diameter and the radial clearance 19 is 0.0010 inch, each end of the bushing 26 would have a long chamfer which would leave a radial clearance of 0.0015 inch at the end of the bushing, points 31 and 32, and the clearance would taper in a straight line relation from 0.0015 inch at the end to 0.0010 inch at a point 2 inches in from the end of the bushing. In other words the internal surface of the bushing 26 would taper from a diameter of 1.0030 inches at each end to a diameter of 1.0020 inches at a rate of 0.0005 inch in diameter per inch of length. Alternatively, the taper could be formed on the shaft.

The sealing fluid should be selected with particular interest being paid to its viscosity characteristics. Oils having a viscosity which increases sharply with increasing pressures have been found suitable in certain embodiments of this invention. The viscosity at 3000 atmospheres pressure often ranges from 100 to 10,000 times the viscosity at 1 atmosphere pressure. For such sealing fluids the viscosity usually changes rapidly with temperature. Thus an efficient sealing fluid must increase its viscosity many-fold when the pressure is doubled or the temperature is halved. Fluids which have been found to be suitable for many process conditions include mineral oils of sufficient viscosity, castor oil, glycerin, polyethylene, polybutene, polyalkylene glycols, polyisobutylene and silicone oils. If necessary, the thicker fluids may be mixed with a solvent in order to obtain a lower viscosity fluid. For instance one oil which has been used extensively has the following specifications: napthenic oil for heavy-duty service having a viscosity of one poise at 38° C. and one atmosphere pressure and a viscosity of 5,000 poises at 3,000 atmospheres and 38° C., the drop in its viscosity being about 6-fold when the temperature increases from 38° C. to 75° C.

One object of the cooling systems shown in Figure III is to allow control of the viscosity of the sealing fluid, as will be explained hereinafter.

Figure IV shows an assembly of a reaction vessel fitted with the rotating shaft seals of this invention and with a differential pressure regulator for controlling the pressure of the sealing fluid. Reaction vessel 5 is fitted with a rotating shaft 6 and a seal bushing assembly 3 as described hereinbefore.

The differential pressure regulator is composed of a hollow regulator body 43, a piston 44, a needle 37 and various inlet and exit ports for sealing fluid and for process fluid. The lower face of the piston 44 is subjected to the process pressure in vessel 5 through line 45, and therefore the pressure on the lower face of piston 44 always reflects the pressure inside vessel 5 at any instant. The space above the upper face of piston 44 is connected directly to sealing fluid line 15 which is the inlet line to the rotary shaft seal of this invention. The piston 44 may have grooves 47 cut into its surface perpendicular to the axis of the piston. The presence of grooves 47 eases the axial motion of the piston. There is no critical number or size of the grooves, although grooves 1/16 inch wide and 1/32 inch deep have been found to be satisfactory.

Sealing fluid is stored in the reservoir 48 under atmospheric pressure if desired, and is introduced to the system by flowing through line 33 to a high-pressure pump 34 which is driven by a motor or other power source 41. A suitable high pressure pump which may be used in the practice of this invention is a screw pump or spindle drag pump. Such a pump is comprised of a spindle fitting with a radial clearance of about 0.001 inch into a surrounding jacket which may be cooled. The surface of the spindle is machined to form a screw thread from each end toward the middle of the spindle. If the threads are sufficiently shallow and broad, for example 0.004 inch in depth and 3/8 inch wide for a spindle of about one inch in diameter, extremly high pressures can be developed. The viscous sealing fluid of this invention is introduced into the pump at each end of the spindle, the rotation of the spindle together with the helix of the screw threads drag the fluid to the middle of the spindle where it is discharged at high pressure. For example, using the preferred sealing fluid of this invention in a spindle drag pump having a spindle 33 inches long and one inch in diameter, and being surrounded by a jacket with a radial clearance of 0.001 inch, the spindle having screw threads 0.004 inch deep and 3/8 broad with a pitch of 1/2 inch, and the spindle turning at 1,750 R. P. M., the sealing fluid was delivered from the outlet of the pump at a rate of 5.5 cubic inches per minute and at a pressure of 25,000 pounds per square inch. Other pumps may be utilized in process of this invention as may be evident to those skilled in the art. The sealing fluid, under a pressure higher than the process pressure in vessel 5 flows through line 35 and divides its flow, part of the fluid going through line 15 to the rotary shaft seal, and the remainder going through line 40 to the differential pressure regulator in the cylinder space above piston 44. The sealing fluid which was delivered to the seal fills the clearance 19 between the rotating shaft 6 and the seal bushing assembly 3. All of the sealing fluid, except for a minute leakage into vessel 5 at 31 leaves the seal through line 16 to line 39 and thence to reservoir 48 to complete that circuit. The sealing fluid which entered the differential pressure regulator through line 40 flows into the clearance 36 around needle 37, leaving through line 38 to line 39 and thence to the reservoir 48, completing the other sealing fluid circuit. Rod 42 connected to the tip of needle 37 may be used, as described later, to actuate an alarm or a switch depending on the position of the piston 44.

Needle 37 may be of any size, but it is desirable that it be relatively small in cross-section in order for the regulator to be small. The area of the upper face of piston 44, which is subjected to the pressure of the sealing fluid entering the seal, is smaller than the area of the lower face by the cross-sectional area of the needle 37. Thus the pressure of the sealing fluid on the upper face of piston 44 must be correspondingly greater than the process pressure on the lower face of piston 44 in order for the piston to be in equilibrium. The ratio of the cross-sectional area of the piston 44 exposed to the process pressure to the cross-sectional area of the upper face of the piston exposed to the pressure of the sealing fluid is therefore equal to the ratio of the pressure of the sealing fluid in line 15 to the process pressure in vessel 5. For example, if the cross-sectional area of piston 44 is 101 and the cross-sectional area of needle 37 is 1, the cross-sectional area of the upper face of piston 44 exposed to the sealing fluid pressure will be 100 and the pressure of the sealing fluid in line 15 will therefore be 1% higher than the process pressure in vessel 5, whenever the piston 44 is in equilbrium. Therefore, the size of the needle 37 may be selected after determining the pressure excess which is desired for the sealing fluid. It has been found suitable for control of pressures of 1800 atmospheres or more to make needle 37 with a diameter of approximately ⅛ inch, having a radial clearance 36 of approximately 0.00025 inch, and having piston 44 with a diameter of 1¼ inches. This particular embodiment therefore allows piston 44 to be in equilibrium when the sealing fluid in line 15 has a pressure in excess of the process fluid pressure in line 45 by 18 atmospheres or about 1% of the process pressure.

In Figure V there is illustrated a desirable configuration for the tip of needle 37 which is suitable for controlling sealing fluid pressures from about 1500 to 3000 atmospheres. It has been found preferable to form the needle 37 into two conical surfaces and one cylindrical portion. From its juncture with piston 44 to about one inch from the end of the needle 37, the needle is cylindrical, fitting with a radial clearance 36 of about 0.00025 inch inside the regulator body 43. From the end of the cylindrical surface, at point 49, for a distance of about ¾ inch, the needle 37 has a conical surface 50 tapering from a radial clearance 36 of about 0.00025 inch to a radial clearance 51 of about 0.0006 inch, and from this point the needle has a second conical surface 52 for the remaining ¼ inch, tapering from said radial clearance of 0.0006 inch to the tip 53 of the needle 37, which tip 53 is a flat surface having a diameter of about 3/32 inch and is perpendicular to the axis of the needle 37. The 3/32 inch diameter tip 53 forms a suitable juncture surface for rod 42, which might be a wire of 3/32 inch diameter.

Rod 42 can be connected through mechanical devices to an alarm or a switch or the like. For example, if the process pressure is too high in line 45 and the pump 34 does not deliver sealing fluid with sufficient pressure to counteract the high process pressure in line 45, piston 44 will move upward. Rod 42 could then be connected so as to actuate an alarm as the rod moves upward, or it could be made to switch in another pump similar to pump 34 and thus supply more sealing fluid and thus create more pressure to balance the forces on piston 44. On the other hand, a downward movement of rod 42, indicating too much pressure on the sealing fluid, might be made to open a by-pass line from the line 35 directly to the reservoir 48.

The principle on which the rotary shaft seal and the differential pressure regulator operate is that the sealing fluid, having a sufficiently high viscosity, will move through clearances 19 and 36 with such high pressure losses that the sealing fluid will have lost its high pressure by the time it reaches outlet lines 16 and 38. As the path of the small clearance 19 or 36 through which the sealing fluid must pass becomes longer in linear distance, flow of fluid in the clearance becomes less. Thus in Figure III, the location of inlet 15 is important in that the distance from the inlet 15 to 31 along the clearance 19 must be sufficient to reduce flow at 31 to a very small amount. Because of the greater pressure differential between 16 and 15, and the lower average pressure and therefore the lower average viscosity of the sealing fluid, the great majority of the sealing fluid will flow from 15 to 32 rather than from 15 to 31. This is true because as the pressure of the sealing fluid becomes less and less, its viscosity decreases making it easier for the fluid to flow from 15 to 16. Between 15 and 31 however, because the pressure at 31 is high and correspondingly, the viscosity is high offering a greater resistance to flow than found between 15 and 16, the flow of sealing fluid from 15 to 31 will be much smaller.

For the design reproduced on Figure III, part of the seal extending from 15 to 31 is subjected to the process pressure acting externally to the jacket 29, balancing the effect of the sealing fluid pressure which tends to open the clearance. This balancing effect will therefore further contribute towards diminishing the leakage of the sealing fluid to the process fluid. In practice, however, it has been found that balancing the seal to prevent dilation and therefore to reduce leakage is not an essential feature of this rotary shaft seal and that many other ways of mounting jacket 29 will also be satisfactory.

The rotation of the shaft, fitted with a small clearance into its bushing, requires a certain amount of power to overcome the friction forces due to the shearing of the viscous sealing fluid flowing in the clearance. This absorption of power will result in a dissipation of heat. Furthermore, the pressure losses which the sealing fluid undergoes when flowing along the seal are due to friction losses, and are also accompanied by a dissipation of heat. Since the viscosity of these sealing fluids decreases with increasing temperatures, the sealing fluid must be cooled in some way to maintain the viscosity at a high enough value to permit normal operation of the seal. If the viscosity is too low, leakage at 31 and 32 will be too great and there will be an insufficient pressure in clearance 19 to withstand the process pressure acting on the seal at 31. However, if the process fluid is hot, it is necessary to carry away the heat transmitted from the process fluid to bushing 26 and to shaft 6 in order to protect the sealing fluid from overheating. To summarize, there are at least three sources of heat which may cause an undesirable rise in the temperature of the sealing fluid, and thus an undesirable lowering of its viscosity; firstly, the heat due to friction losses and pressure losses as the fluid flows through clearance 19; secondly, the heat generated by rotation of shaft 6 causing a shearing of the sealing fluid; and thirdly, the heat derived from the hot process fluid inside vessel 5. Therefore, cooling systems, as shown in Figure III, are desirable for conducting heat away from the sealing fluid in clearance 19 and also for protecting the sealing fluid from hot process fluids and thus maintaining the proper viscosity level.

The action of the differential pressure regulator shown in Figure IV is similar to that of the seal just described. The clearance 36 around needle 37 is such a small space that the sealing fluid cannot flow past the needle to outlet 38 without difficulty and without a high loss of pressure. This loss of pressure is accompanied by a dissipation of heat, so that a cooling system, such as described above for the seal, may also be used for the regulator. Thus a sudden surge of pressure through line 45 would force piston 44 upward, but only slightly because the pressure of the fluid above piston 44 would increase rapidly with a very small change of volume. Excess fluid not being able to be expelled quickly through clearance 36, would then flow through lines 40 and 15, increasing the pressure at the seal. At the same time a certain amount of fluid will flow more or less slowly through clearance 36 to lines 38 and 39 and empty into the reservoir 48. A continued high pressure in line 45 that was in excess of the pressure in line 40 would move piston 44 and needle 37 upward, increasing the length of the annular clearance 36 through which fluid must pass. The increased length of clearance 36 would increase the resistance to the flow of fluid through that clearance and cause a pressure build-up in line 40. At some point the length of clearance 36 would result in a sufficient increase in sealing fluid pressure in line 40 and in the space above piston 44, such that the piston would stop moving and be in equilibrium again. In a similar manner a sudden decrease in pressure in line 45 would allow the piston 44 to move downward, thus shortening the length of clearance 36 and decreasing the resistance to flow such that more fluid would go by the route of line 40, clearance 36, lines 38 and 39, to reservoir 48. This route would then be an easier one for the fluid and the pressure would correspondingly decrease in line 15, thus decreasing leakage from 31 into vessel 5, until equilibrium was established on the piston 44. The maximum length of clearance 36 depends on the maximum sealing fluid pressure which must be controlled. It has been found, however, that if needle 37 is about 3½ to 4 inches long, pressures of 1800 atmospheres or more can be controlled when using the recommended sealing fluids, or others with comparable viscosity characteristics. For the control of higher pressures, a longer needle may be employed.

The actual time lag for the regulator to follow changes in process pressures as described above has been determined by tests and found to be no more than about 1/10 second for sudden pressure variations of the order of about 400 atmospheres.

The amount of sealing fluid which is used in the operation of the seal is very small. For a seal with a ¾-inch shaft diameter, when the process pressure is 25,000 p. s. i. and has a temperature of about 300° C. inside the reaction vessel and the linear distance from 31 to 32 in Figure III is 9 inches, sealing fluid may be introduced through line 15 at about 25,250 p. s. i. If the inlet line 15 is about 3 inches from 31, the pressure of the sealing fluid will drop from 25,250 p. s. i. to 25,000 p. s. i. by the time it reaches 31. In the same manner, and at the same time, the pressure will drop from 25,250 p. s. i. to atmospheric pressure as the sealing fluid moves from the inlet 15 to 32. The amount of sealing fluid used under such conditions in the seal of this invention was of the order of 60 drops of fluid per minute, that is, approximately 60 drops per minute flows from inlet line 15 to outlet 32. Since the pressure differential from line 15 to 32 is about 25,250 p. s. i., and the pressure differential from line 15 to 31 is only 250 p. s. i., and the sealing fluid being always under high pressure and having a very high viscosity at 31, it can be seen that the flow of sealing fluid out of 31 and into the interior of vessel 5 is extremely small, less than 1 drop per minute. In the example described above, the sealing fluid may be a naphthenic oil for heavy-duty service which is maintained at a temperature of about 38° C. which in turn keeps the viscosity of the oil in the range of 100 to 150 poises at 25,000 p. s. i.

While the above description refers to a reaction vessel with an agitator, the seal of this invention may be used wherever there is a rotating shaft which may be sealed with a fluid. This rotary shaft seal has particular application where the internal pressures are very high, that is, in excess of about 1000 atmospheres, when the process fluid is hot or corrosive, and where it is economical to machine the shaft and the seal-bushing assembly to close tolerances and it is convenient to maintain such fits. For example, high-pressure centrifugal circulating pumps may utilize the seal of this invention, and especially so where the fluid being pumped is hot and corrosive and destroys ordinary mechanical seals. The drawings show the seals and rotor mounted in a vertical position, however the mechanism of this invention may be utilized in a horizontal position, in which case radial bearings or combination radial-thrust bearings may be utilized on each seal to carry part of the weight of the shaft and rotor. Other embodiments of this invention may occur to those skilled in the art.

I claim:

1. A bearing seal for rotary shafts which comprises a substantially inflexible shaft which fits in rotating relationship into the bore of a substantially inflexible bushing constituting a bearing surface for said shaft, said bushing piercing the wall of a pressure vessel and being in a fixed relationship thereto, the high pressure end of said bushing being at the inside surface of said vessel and the low pressure end of said bushing being at the outside surface of said vessel, a radial clearance between said bushing and said shaft extending for an axial length of 4 to 15 times the diameter of said shaft, the diameter of said bore being from 0.0006 inch to 0.0030 inch larger than the diameter of said shaft, a means for introducing sealing fluid at any desirable pressure into said radial clearance at a position approximately one-third of said axial length from said high pressure end of said bushing, a means for withdrawing said sealing fluid from said low pressure end of said bushing, and means for cooling the surface of said shaft and the surface of said bore defining said radial clearance.

2. In combination, a closed vessel having an internal process fluid pressure of at least 500 atmospheres, a fixed inflexible bushing extending through the wall of said vessel, an inflexible, rotatable shaft mounted in the bore of said bushing, the diameter of said bore being 0.0006 inch to 0.0030 inch in excess of the diameter of said shaft, thereby forming an annulus, said annulus having an axial length of 4 to 15 times the diameter of said shaft, an inlet port through the wall of said bushing and opening into said annulus at a position approximately one-third of said axial length from the end of said annulus adjacent the inside surface of said vessel, an outlet port communicating with the end of said annulus adjacent the outside surface of said vessel, means for supplying a sealing liquid to said inlet port at a pressure slightly in excess of the prevailing pressure of said internal process fluid, means for removing said sealing liquid from said outlet port and recirculating that sealing liquid back to said inlet port, means responsive to the pressure changes on said internal process fluid and capable of transmitting said changes so as to maintain the pressure of said sealing liquid higher than the pressure of said internal process fluid, said sealing liquid being a lubricant having a viscosity at 38° C. and 1 atmosphere pressure of 0.5–4.0 poises, and having a viscosity at 38° C. and 3000 atmospheres pressure of 100–10,000 poises, means for cooling the surface of said bore and for cooling the surface of said shaft and thereby controlling the viscosity and the pressure of said sealing liquid in said annulus.

References Cited in the file of this patent

UNITED STATES PATENTS

| | | |
|---|---|---|
| 1,707,612 | Hollander | Apr. 2, 1929 |
| 1,807,798 | Short | June 2, 1931 |
| 1,873,988 | Van Rijswijk | Aug. 30, 1932 |
| 1,932,995 | Van Rijswijk | Oct. 31, 1933 |
| 2,325,283 | Swearingen | July 27, 1943 |
| 2,347,296 | Starr | Apr. 25, 1944 |
| 2,350,753 | Grobil | June 6, 1944 |
| 2,525,695 | Lombard | Oct. 10, 1950 |
| 2,666,658 | Laucks | Jan. 19, 1954 |